(12) United States Patent
Stiehler

(10) Patent No.: US 7,156,565 B2
(45) Date of Patent: Jan. 2, 2007

(54) DRIVER FOR OPENING AND CLOSING DUAL-BLADE SHUTTER ADAPTED TO BE RESET WITHOUT RE-OPENING SHUTTER

(75) Inventor: Wayne E. Stiehler, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/972,807

(22) Filed: Oct. 25, 2004

(65) Prior Publication Data

US 2006/0088313 A1    Apr. 27, 2006

(51) Int. Cl.
*G03B 9/20* (2006.01)

(52) U.S. Cl. ............................... 396/497; 396/500
(58) Field of Classification Search ................ 396/454, 396/471, 495, 497, 500, 502
See application file for complete search history.

(56) References Cited

U.S. PATENT DOCUMENTS

| | | | |
|---|---|---|---|
| 3,251,288 A | 5/1966 | Kitai | 95/62 |
| 3,319,554 A | 5/1967 | Bresson et al. | 95/53 |
| 3,707,118 A | 12/1972 | Stoneham et al. | 95/62 |
| 5,136,324 A | 8/1992 | Tsuboi et al. | 354/400 |
| 5,235,366 A | 8/1993 | Kucmerowski | 354/212 |
| 5,258,797 A | 11/1993 | Oyoshi et al. | 354/400 |
| 5,721,995 A | 2/1998 | Katsura et al. | 396/351 |
| 5,890,026 A | 3/1999 | Smith et al. | 396/493 |
| 5,915,141 A | 6/1999 | Ebe | 396/470 |
| 6,086,268 A * | 7/2000 | DiRisio | 396/495 |
| 6,682,232 B1 * | 1/2004 | Smith et al. | 396/444 |
| 6,786,657 B1 * | 9/2004 | Dirisio et al. | 396/493 |
| 6,954,586 B1 * | 10/2005 | Cornell | 396/6 |

* cited by examiner

*Primary Examiner*—W. B. Perkey
*Assistant Examiner*—Chia-how Michael Liu
(74) *Attorney, Agent, or Firm*—Robert Luke Walker

(57) ABSTRACT

In a camera, a dual-blade shutter has a pair of shutter blades supported for opening and closing movement to uncover and re-cover an exposure aperture, and a shutter driver that projects into respective overlapping slots in the shutter blades and is supported for shutter opening and closing movement. A high impact striker is movable against a strike portion on the shutter driver to initiate shutter opening movement of the shutter driver, then moves beyond the strike portion, and is returnable past the strike tab to be reset. A fixed post projects into an elongate slot in the shutter driver to support the shutter driver for shutter opening and closing movement and to allow the high impact striker to shift the shutter driver out of the way of the high impact striker so that the high impact striker can be returned past the strike tab without causing the shutter blades to be moved open.

19 Claims, 7 Drawing Sheets

DRIVER FOR OPENING AND CLOSING DUAL-BLADE SHUTTER ADAPTED TO BE RESET WITHOUT RE-OPENING SHUTTER

FIELD OF THE INVENTION

The invention relates generally to cameras and more particularly to a driver for opening and closing a dual-blade shutter in a camera. The driver is adapted to be re-set without re-opening the shutter.

Although embodied preferably in a photographic camera, the invention could also be used in a digital camera.

BACKGROUND OF THE INVENTION

General Description Of Camera

Film and cameras that are all in one, commonly referred to as disposable single-use or one-time-use cameras, have become well known. The one-time-use camera is a simple point-and-shoot type camera comprising a conventional film cartridge loaded into a cartridge receiving chamber in a main body part, an unexposed film roll pre-wound from the film cartridge onto a film supply spool in a film supply chamber in the main body part, a film-exposing back-frame opening between the cartridge receiving and film supply chambers, a fixed-focus taking lens, a manually rotatable film winding thumbwheel coaxially engaged with a film winding spool inside the film cartridge for winding the filmstrip after each exposure, a metering lever for locking the thumbwheel, a single-blade shutter, a high energy lever for actuating the shutter blade to make an exposure and for moving the metering lever to unlock the thumbwheel, a manually depressible shutter release button for unlatching the high energy lever, a frame counter wheel that has a numerical scale of frame count indicia and is incrementally rotated to successively view the frame count indicia, a metering sprocket for incrementally rotating the frame counter wheel during film winding, a metering cam coaxially connected to the metering sprocket for controlling movement of the high energy lever and metering lever during film winding, an anti-backup pawl that engages the frame counter wheel to prevent its reverse rotation, a direct see-through viewfinder having front and rear viewfinder lenses, and in some models an electronic flash. A pair of separate front and rear cover parts house the main body part between them to complete the camera. The rear cover part connects to the main body part and/or to the front cover part to make the main body part light-tight. A decorative cardboard outer box or label at least partially covers the front and rear cover parts and has respective openings for the taking lens, etc.

To make an exposure on film, the shutter release button is manually depressed. This unlatches the high energy lever which is then pivoted via a high energy spring to impact against a strike tab on the shutter blade. The shutter blade in turn is pivoted open to uncover an exposure aperture. Once the high energy lever is pivoted beyond the strike tab, a return spring pivots the shutter blade closed to re-cover the exposure aperture.

The high energy spring continues to pivot the high energy lever as the shutter blade is being pivoted closed, in order to cause the high energy lever to pivot the metering lever out of locking engagement with the thumbwheel. The timing is such that once the shutter blade is pivoted closed the thumbwheel is freed to be manually rotated in the film winding direction. Rotation of the thumbwheel rotates the film winding spool inside the film cartridge to wind an exposed frame of the filmstrip from the back-frame opening into the film cartridge and to advance an unexposed frame of the filmstrip from the unexposed film roll to the back-frame opening. The rewinding movement of the filmstrip the equivalent of slightly more than one frame width rotates the metering sprocket in engagement with successive perforations in the filmstrip to incrementally rotate the frame counter wheel to view its next lower-numbered indicia. Also, the metering sprocket rotates the metering cam to return the high energy lever past the strike tab of the shutter blade and so that the high energy spring can hold the high energy lever re-latched. Since the high energy spring is then constrained, a metering spring (which is weaker than the high energy spring) is allowed to return the metering lever to locking re-engagement with the thumbwheel. Alternatively, when there is no metering spring as in U.S. Pat. No. 5,235,366 issued Aug. 10, 1993, the high energy spring returns the metering lever to locking engagement with the thumbwheel.

When the maximum number of frames available on the filmstrip have been exposed and the filmstrip is completely wound into the film cartridge, the one-time-use camera is given to a photofinisher who breaks away a cover door portion of the rear cover part from the main body part and removes the film cartridge with the exposed filmstrip from the cartridge receiving chamber. Then, he removes the exposed filmstrip from the film cartridge to develop the latent images and make prints for the customer.

Problem

U.S. Pat. No. 5,235,366 issued Aug. 10, 1993 and U.S. Pat. No. 6,033,133 issued Mar. 7, 2000 teach pivotably supporting the single-blade shutter using a fixed round pivot-support post that projects into an elongate pivot slot in the shutter blade. When the high energy lever is returned past the strike tab of the closed blade, to permit the high energy lever to be re-latched, the high energy lever presses against the strike tab. Ordinarily, the high energy lever might possibly be blocked by the strike tab. However, the elongate slot allows the high energy lever to shift or translate the shutter blade out of its way without pivoting the shutter blade open. This now is typical of many cameras having a single-blade shutter.

The issue becomes more complex when a dual blade shutter is used instead of a single-blade shutter. Generally, dual-blade shutters are center-opening, i.e. the two blades pivot open in opposite directions away from one other to uncover the exposure aperture and return to an overlapping closed relation to re-cover the exposure aperture. As in U.S. Pat. No. 5,136,324 issued Aug. 4, 1992, U.S. Pat. No. 5,258,797 issued Nov. 2, 1993, and U.S. Pat. No. 5,721,995 issued Feb. 24, 1998, individual fixed pivot-support posts project into respective round pivot holes in the two blades, and a rotatable or pivotable shutter driver for opening and closing the two blades projects into respective overlapping slots in the two blades. Movement of the shutter driver in one direction within the overlapping slots pivots the two blades about the pivot-support posts to open, and movement of the shutter driver in an opposite direction within the overlapping slots pivots the two blades about the pivot-support posts to close.

SUMMARY OF THE INVENTION

A camera comprising an exposure aperture, a dual-blade shutter having a pair of shutter blades supported for opening movement about respective axes to uncover the exposure aperture and for closing movement about the axes to recover the exposure aperture, and a shutter driver that projects into respective overlapping slots in the shutter blades and is supported for shutter opening movement to move the shutter blades open and for shutter closing movement to move the shutter blades closed, is characterized in that:

a high impact striker is movable against a strike portion on the shutter driver to initiate shutter opening movement of the shutter driver, then moves beyond the strike portion, and is returnable past the strike tab to be reset; and a fixed post projects into an elongate slot in the shutter driver to support the shutter driver for shutter opening and closing movement and to allow the high impact striker to shift the shutter driver out of the way of the high impact striker so that the high impact striker can be returned past the strike tab without causing the shutter blades to be moved open.

DETAILED DESCRIPTION OF THE INVENTION

The invention is disclosed as preferably being embodied in a one-time-use camera. Since the elements of a one-time-use camera are generally known, the description which follows is directed mostly to those elements forming part of or cooperating with the invention. It is understood that those elements not disclosed may take various forms known to persons of ordinary skill in the camera arts.

Figure 1:
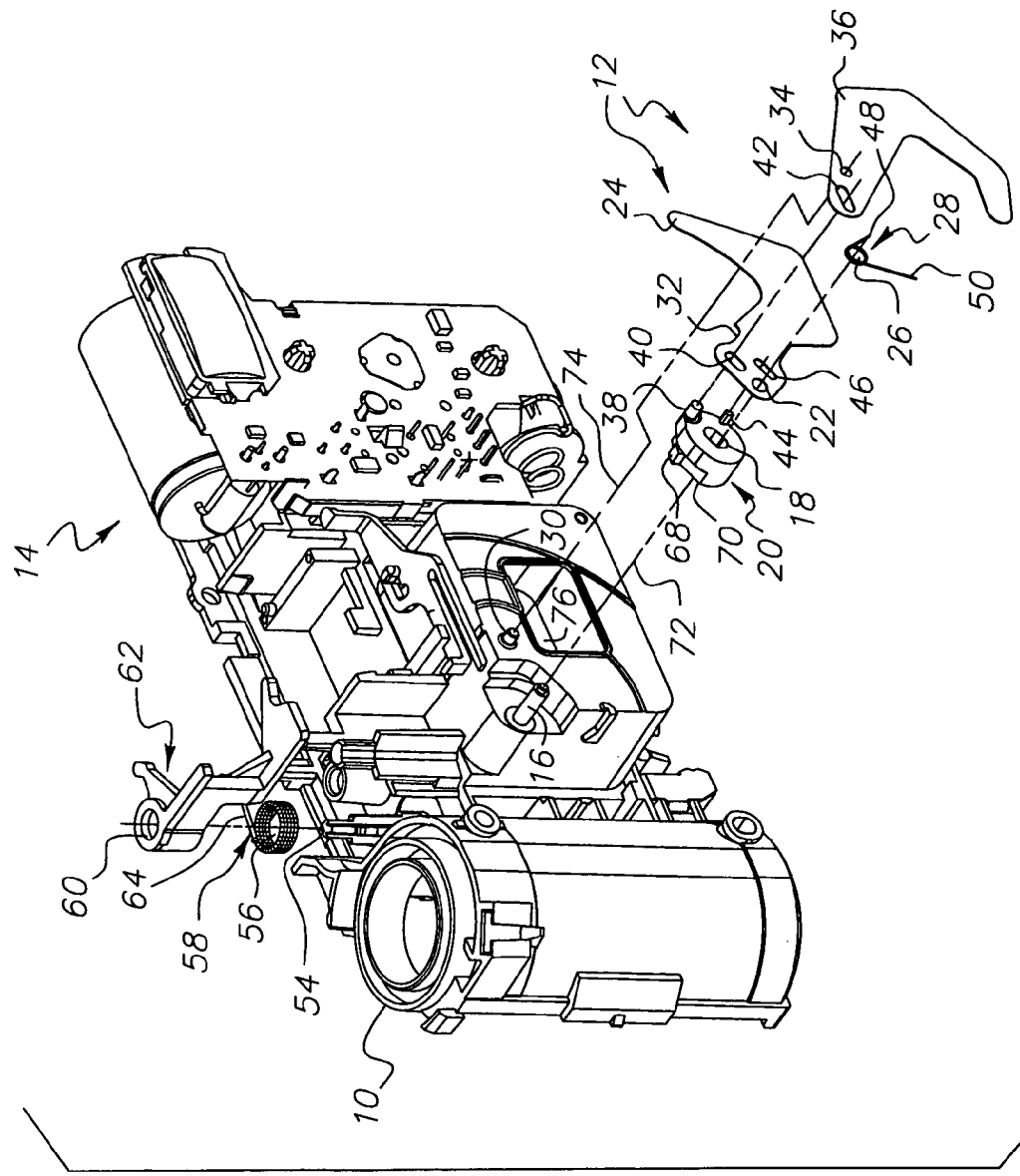
FIG. 1 is an exploded front perspective of a partially illustrated one-time-use camera including a shutter driver for opening and closing a dual-blade shutter that can be reset without re-opening the shutter, according to a preferred embodiment of the invention.
Figure 2:
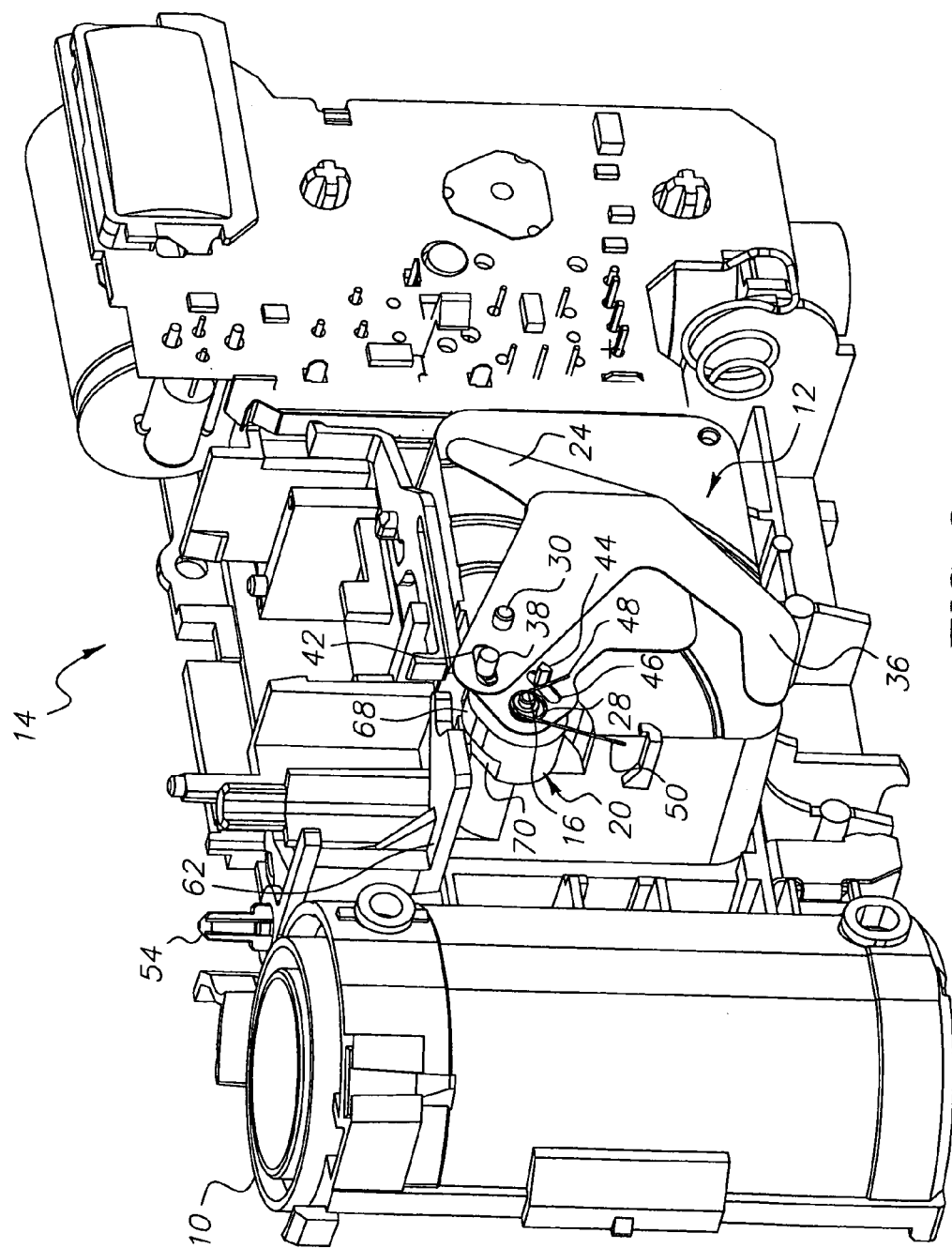
FIG. 2 is a front perspective view of the partially illustrated camera showing the dual-blade shutter closed.
Figure 3:
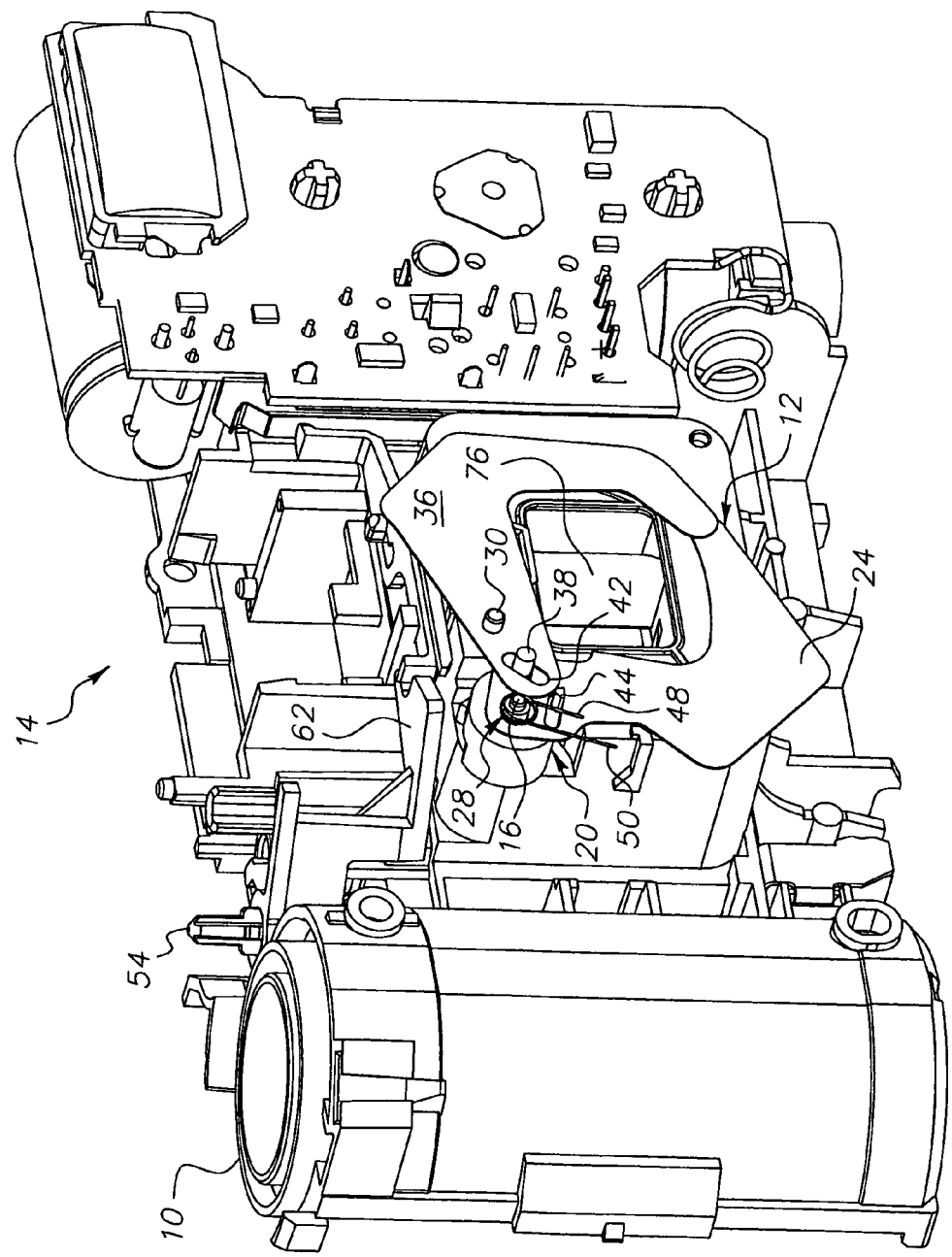
FIG. 3 is a front perspective view of the partially illustrated camera showing the dual-blade shutter open.

Referring now to the drawings, and in particular to FIGS. 1–3, there is shown a main body part 10 and a dual-blade center-opening shutter 12 of a partially depicted one-time-use camera 14.

As shown in FIG, 1, a fixed round pivot-support/translation-support post 16 on the main body part 10 projects frontward through an elongate slot 18 in a rotatable and translatable shutter opening and closing driver 20, then through a round pivot hole 22 in a first shutter blade 24 of the dual-blade shutter 12, and then into a center-coil opening 26 in a hairpin-shaped driver return spring 28. The shutter driver 20, the first shutter blade 24, and the driver return spring 28 are assembled on the fixed post 16.

Figure 4:
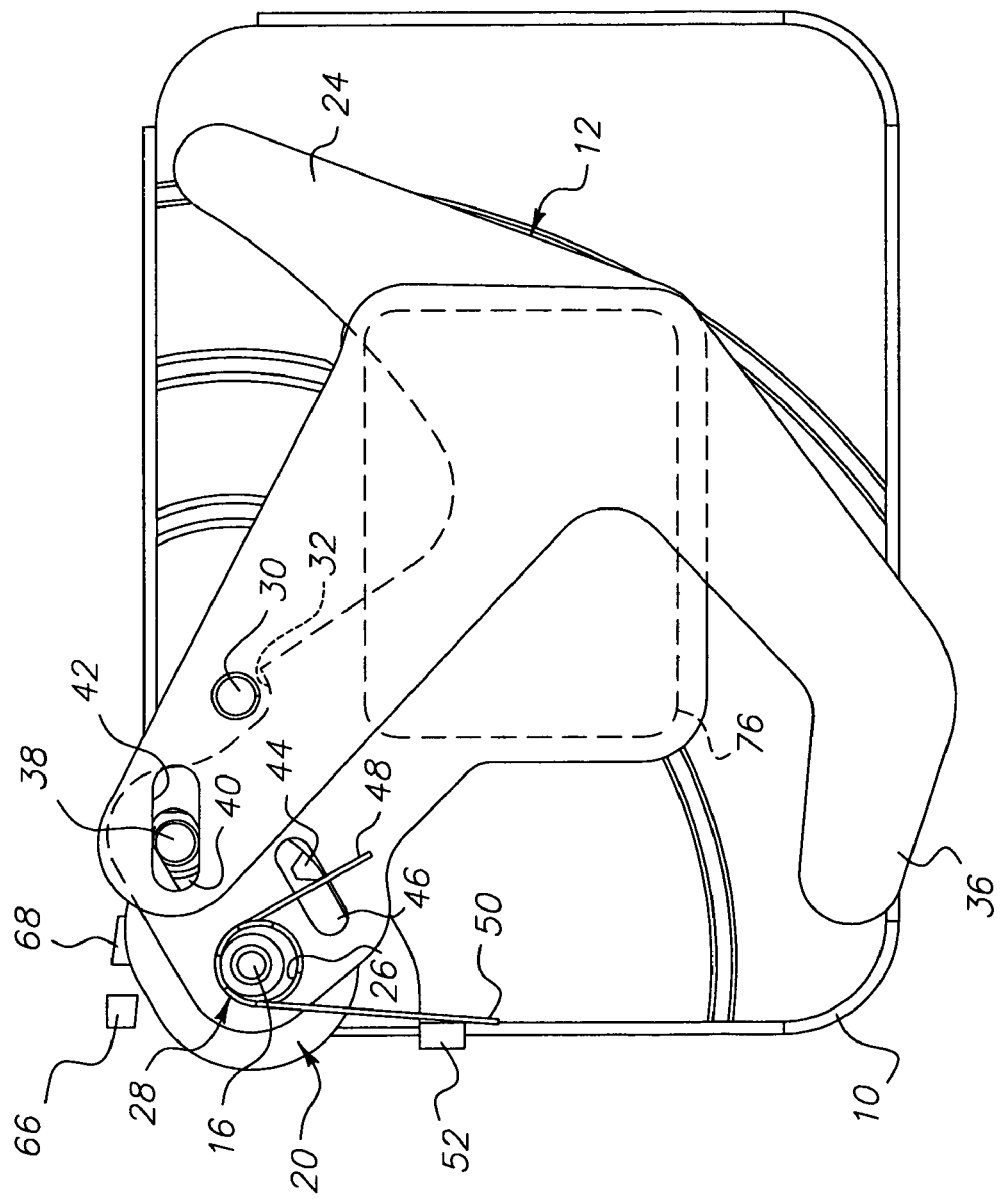
FIGS. 4, 5, 6 and 7 are front elevation views of the shutter driver and the dual-blade shutter showing sequential steps in their mutual operation.

As shown in FIGS. 1 and 4, a fixed round stop and pivot-support post 30 on the main body part 10 projects frontward opposite an edge notch 32 in the first shutter blade 24 of the dual-blade shutter 12 and then into a round pivot hole 34 in a second shutter blade 36 of the dual-blade shutter. The second shutter blade 36 is assembled on the fixed post 30.

As shown in FIG. 1, a shutter drive post 38 on the shutter driver 20 projects frontward through an elongate slot 40 in the first shutter blade 24 and then into a similar size slot 42 in the second shutter blade 36. The two elongate slots 40 and 42 partially overlap. See FIG. 4.

As shown in FIGS. 1 and 4, an energizing post 44 on the shutter driver 20 projects frontward through a clearance slot 46 in the first shutter blade 24 and then into restraining contact with a resilient leg 48 of the hairpin-shaped driver return spring 28. Another leg 50 of the driver return spring 28 is held fast by a fixed lug 52 shown in FIGS. 4–6. This enables the driver return spring 28 to urge the shutter driver 20 to rotate counterclockwise in FIG. 1 about the fixed post 16 on the main body part 10.

A fixed round post 54 on the main body part 10 projects upward in FIG. 1 through a center-coil opening 56 in a high energy spring 58 and then into a round pivot hole 60 in a high energy lever 62. The high energy spring 58 and the high energy lever 62 are assembled on the fixed post 54. A resilient leg 64 of the high energy spring 58 urges the high energy lever 62 to swing counterclockwise in FIG. 1 about the fixed post 54.

Operation

To make an exposure on film, a shutter release button (not shown) is manually depressed. This unlatches the high energy lever 62 which is then swung counter clockwise in FIG. 1 about the fixed post 54 on the main body part 10, via the resilient leg 64 of the high energy spring 58. The high energy lever 62 has a striker projection 66 on its underside that impacts against (strikes) a strike tab 68 on a curved edge portion 70 of the shutter driver 20 to quickly rotate the shutter driver clockwise in FIGS. 2–3 and 4–5 about the fixed post 16 on the main body part 10. As a result, the energizing post 44 on the shutter driver 20 bends the resilient leg 48 of the driver return spring 28 towards the resilient leg 50 of the driver return spring. Also, the shutter drive post 38 on the shutter driver 20 that projects through the elongate slot 40 in the first shutter blade 24 and into the similar size slot 42 in the second shutter blade 36 pivots the first shutter blade clockwise in FIGS. 2–3 and 4–5 about the fixed post 16 on the main body part 10 and pivots the second shutter blade counter clockwise in the same FIGS. about the fixed post 30 on the main body part. This opening movement of the first and second shutter blades 24 and 36 occurs about respective parallel axes 72 and 74 depicted in FIG. 1, and it causes the two blades to swing away from one another to uncover an exposure aperture 76 in the main body part 12 in order to begin exposure on film. When the first shutter blade 24 is pivoted clockwise to open, its edge notch 32 separates from contact with the fixed post 30 on the main body part 10. See FIGS. 3 and 5.

Figure 5:
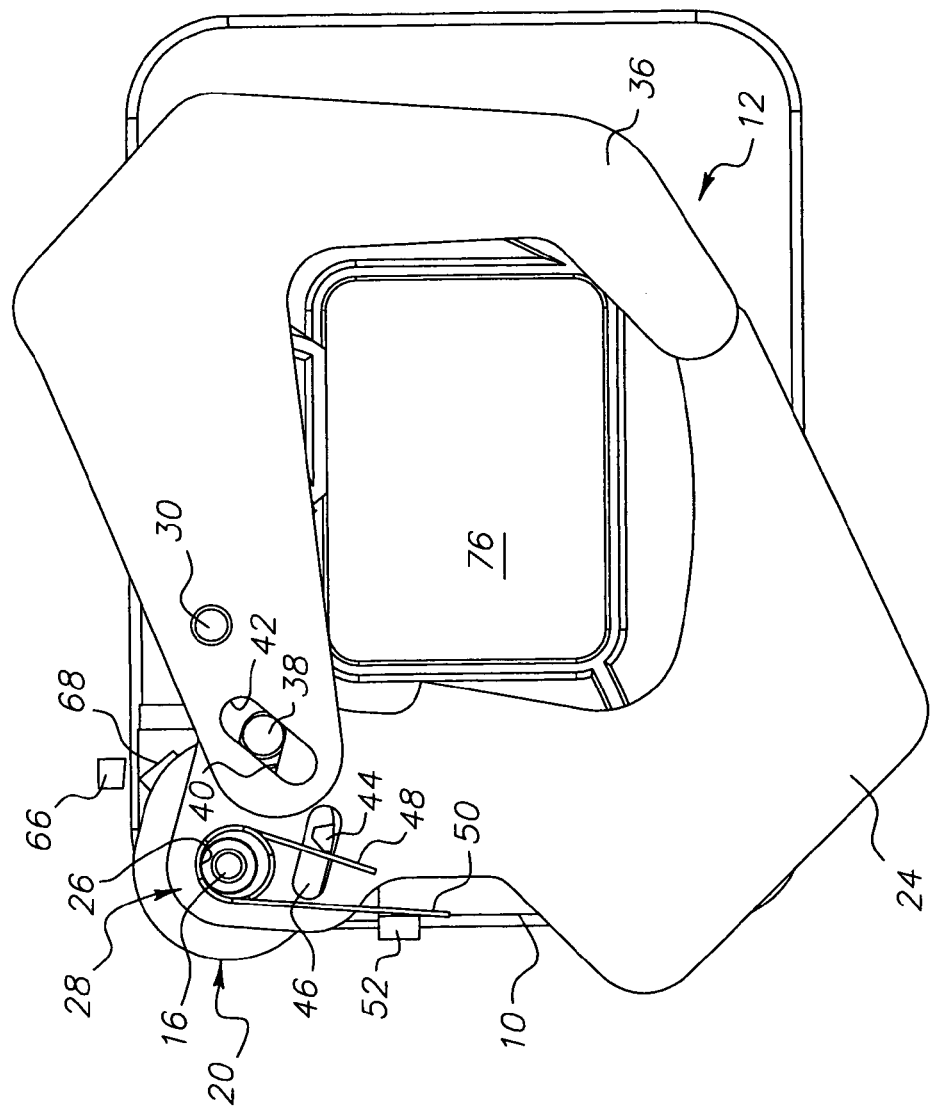

Once the high energy lever 62 has swung counterclockwise about 16° as in FIG.5, the striker projection 66 on the underside of the high energy lever begins to move beyond (away from) the strike tab 68 on the curved edge portion 70 of the shutter driver 20. This allows the resilient leg 48 of the driver return spring 28 to urge the shutter driver 20 to rotate counterclockwise in FIGS. 5–6 about the fixed post 16 on the main body part 10. As a result, the shutter drive post 38 on the shutter driver 20 that projects through the elongate slot 40 in the first shutter blade 24 and into the similar size slot 42 in the second shutter blade 36 pivots the first shutter blade counterclockwise in FIGS. 5–6 about the fixed post 16 on the main body part 10 and pivots the second shutter blade clockwise in the same FIGS. about the fixed post 30 on the main body part. This closing movement of the first and second shutter blades 24 and 36 causes the two blades to swing towards one another into an overlapping relation to re-cover the exposure aperture 76 in the main body part 12 in order to conclude exposure. When the first shutter blade 24 is pivoted counterclockwise to close, its edge notch 32 returns to contact with the fixed post 30 on the main body part 10. See FIG. 6.

Figure 6:
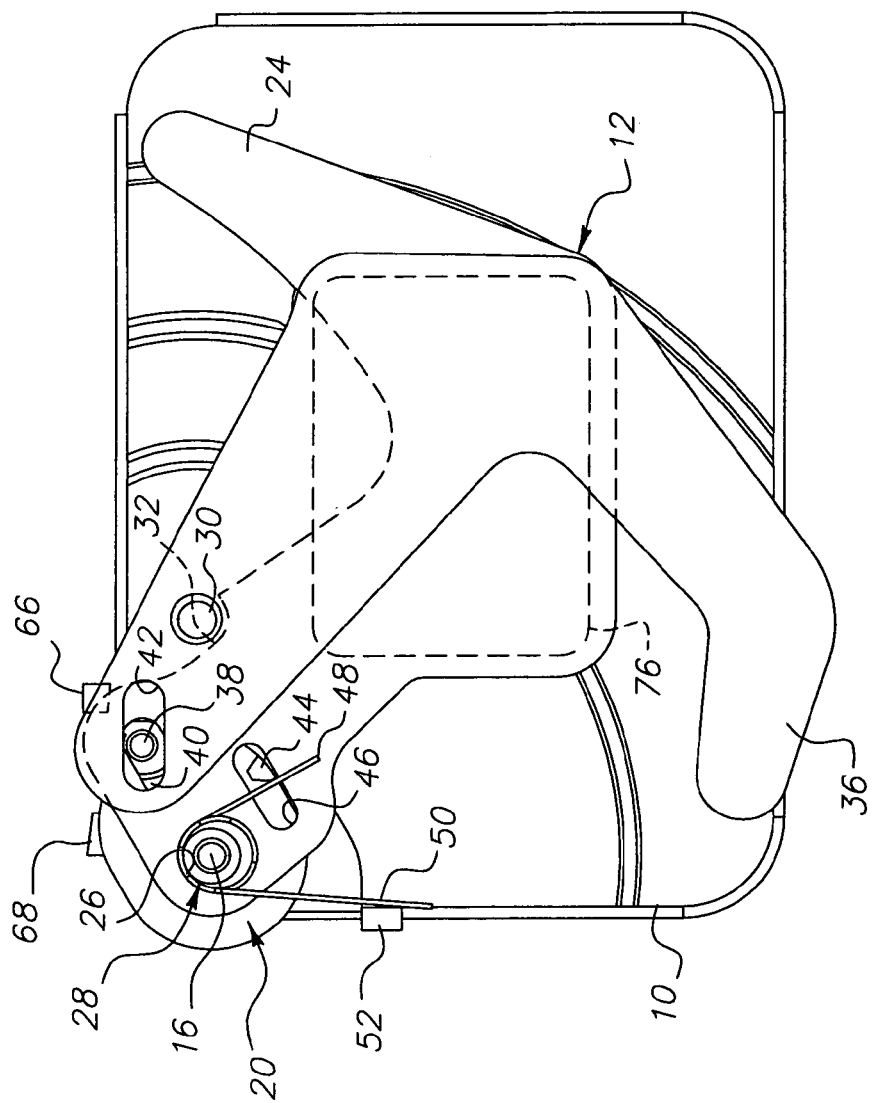
Figure 7:
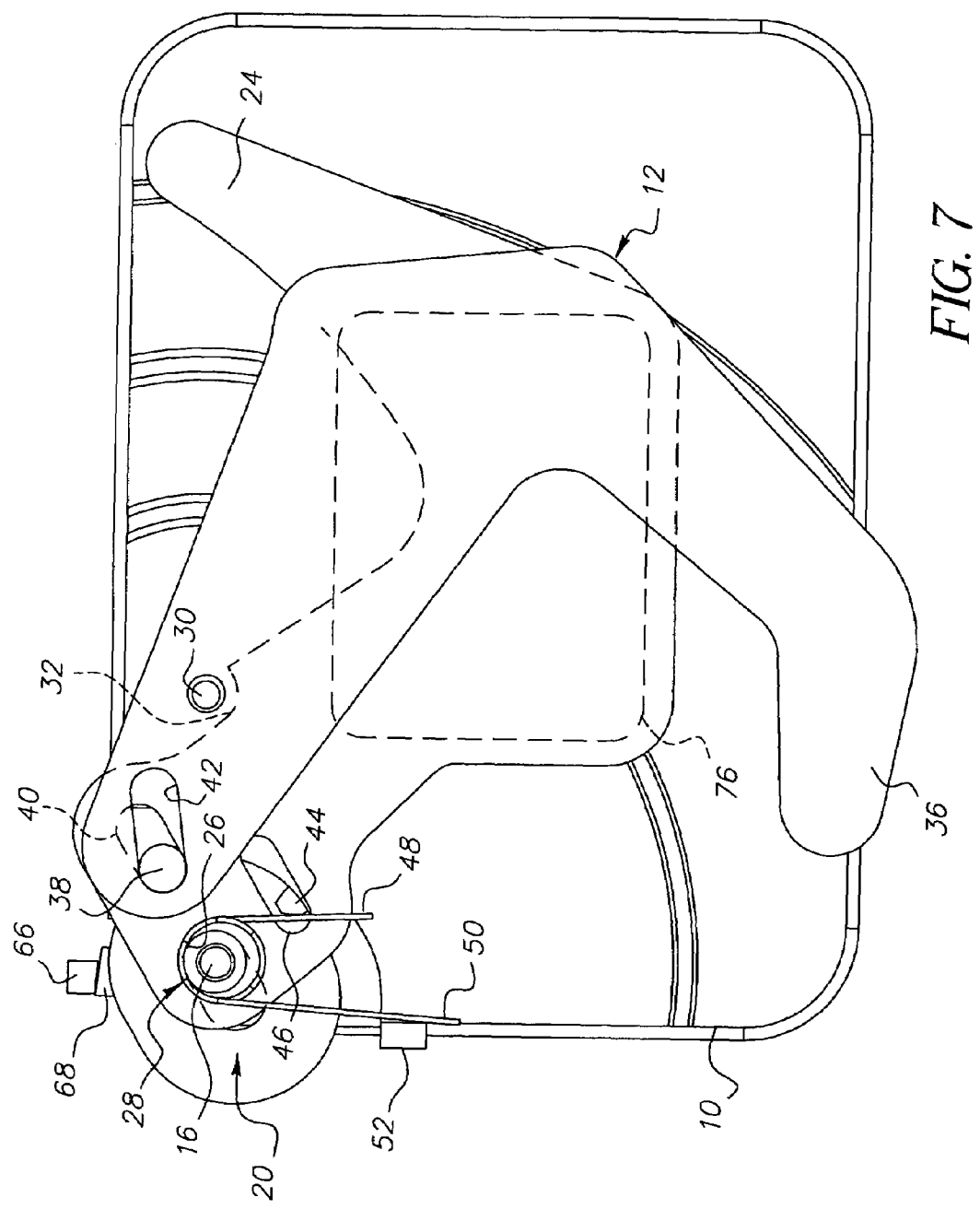

Once the high energy lever 62 has swung counterclockwise a total of about 27° as in FIG. 6, i.e. 11° more than in FIG. 5, it is at the end of travel counterclockwise. Then, as in the prior art, a metering cam (not shown) is rotated during manual film rewinding, to return the high energy lever clockwise to be reset (re-latched). When the high energy lever 62 is partway returned clockwise about 22° as in FIG. 7, the striker projection 66 on the underside of the high energy lever moves over the strike tab 68 on the curved edge portion 70 of the shutter driver 20, causing the striker projection to slightly depress the shutter driver downward to the left at an acute angle of about 30° in FIG. 7 and out of the way of the striker projection. Since the first shutter blade 24 is blocked at its edge notch 32 by the fixed post 30 on the main body part 10, the first shutter blade cannot pivot counterclockwise about the fixed post 16 on the main body part 10. Consequently, the shutter drive post 38 on the shutter driver 20 is constrained to translate in the elongate slot 40 in the first shutter blade 24. This causes the shutter driver 20 to be constrained to translate (rather than rotate) relative to the fixed post 16 in the elongate slot 18 in the shutter driver. Then, once the striker projection 66 on the underside of the high energy lever 62 moves past the strike tab 68 on the curved edge portion 70 of the shutter driver 20 as in FIG. 4, the return spring 28 snaps the shutter driver backward as in the same FIG.

Preferably, the first and second shutter blades 24 and 36 are substantially reverse j-shaped and j-shaped as shown in FIGS. 1–7, to surround the exposure aperture 76 to uncover the exposure aperture when the two blades are open as in FIGS. 3 and 5 and cover the exposure aperture in partially overlapping relation when the two blades are closed as in FIGS. 2, 4, 6 and 7.

The invention claimed is:

1. A camera comprising:
    an exposure aperture;
    a dual-blade shutter having a pair of shutter blades supported for opening movement about respective axes to uncover said exposure aperture and for closing movement about said axes to re-cover said exposure aperture, said shutter blades each having a slot, said slots overlapping;
    a shutter driver that projects into respective overlapping slots in said shutter blades and is supported for shutter opening movement to move said shutter blades open and for shutter closing movement to move said shutter blades closed, said shutter driver having a strike tab;
    a high impact striker movable against said strike tab on said shutter driver to initiate shutter opening movement of said shutter driver, then movable beyond said strike tab, and returnable past said strike tab to be reset; and
    a fixed post projecting into an elongate slot in said shutter driver to support said shutter driver for shutter opening and closing movement and to allow said high impact striker to shift said shutter driver out of the way of said high impact striker so that said high impact striker can be returned past said strike tab without causing said shutter blades to be moved open;
    wherein said shutter driver is rotated during shutter opening and closing movement and is translated to shift out of the way of said high impact striker.

2. A camera as recited in claim 1 wherein said shutter blades are pivoted about said axes to open and close.

3. A camera comprising:
    an exposure aperture;
    a dual-blade shutter having a pair of shutter blades supported for opening movement about respective axes to uncover said exposure aperture and for closing movement about said axes to re-cover said exposure aperture, said shutter blades each having a slot, said slots overlapping;
    a shutter driver that projects into respective overlapping slots in said shutter blades and is supported for shutter opening movement to move said shutter blades open and for shutter closing movement to move said shutter blades closed, said shutter driver having a strike tab;
    a high impact striker movable against said strike tab on said shutter driver to initiate shutter opening movement of said shutter driver, then movable beyond said strike tab, and returnable past said strike tab to be reset; and
    a fixed post projecting into an elongate slot in said shutter driver to support said shutter driver for shutter opening and closing movement and to allow said high impact striker to shift said shutter driver out of the way of said high impact striker so that said high impact striker can be returned past said strike tab without causing said shutter blades to be moved open;
    wherein said fixed post that projects into said elongate slot in said shutter driver is round, and said shutter driver is rotatable about said fixed post during shutter opening and closing movement of said shutter driver and is translatable along said fixed post to allow said high impact striker to shift said shutter driver out of the way of said high impact striker.

4. A camera as recited in claim 3 wherein said shutter driver has a drive post that is spaced from said elongate slot in said shutter driver and projects into said overlapping slots in said shutter blades to drive said shutter blades open and closed during shutter opening and closing movement of said shutter driver.

5. A camera as recited in claim 4 wherein said fixed post that projects into said elongate slot in said shutter driver also projects into a round pivot hole in a first one of said shutter blades to pivotably support said first blade for opening and closing movement about a first one of said axes.

6. A camera as recited in claim 5 wherein a fixed round post projects into a round pivot hole in a second one of said shutter blades to pivotably support said second blade for opening and closing movement about a second one of said axes.

7. A camera as recited in claim 6 wherein said fixed round post that projects into said round pivot hole in said second blade also resides in a notch in said first blade to act as a stop post for said first blade when said first blade is closed, to cause said first blade to constrain said shutter driver to translate along said fixed post that projects into said elongate slot in said shutter driver when said high impact striker shifts said shutter driver out of the way of said high impact striker.

8. A camera comprising:
    an exposure aperture;
    a dual-blade shutter having a pair of shutter blades supported for opening movement about respective axes to uncover said exposure aperture and for closing movement about said axes to re-cover said exposure aperture, said shutter blades each having a slot, said slots overlapping;
    a shutter driver that projects into respective overlapping slots in said shutter blades and is supported for shutter opening movement to move said shutter blades open and for shutter closing movement to move said shutter blades closed, said shutter driver having a strike tab;

a high impact striker movable against said strike tab on said shutter driver to initiate shutter opening movement of said shutter driver, then movable beyond said strike tab, and returnable past said strike tab to be reset; and a fixed post projecting into an elongate slot in said shutter driver to support said shutter driver for shutter opening and closing movement and to allow said high impact striker to shift said shutter driver out of the way of said high impact striker so that said high impact striker can be returned past said strike tab without causing said shutter blades to be moved open;

wherein a return spring is mounted on said fixed post that projects into said elongate slot in said shutter driver and causes shutter closing movement of said shutter driver when said high impact striker is moved beyond said strike tab.

9. A camera as recited in claim 8 wherein an energizing post on said shutter driver energizes said return spring by pushing a movable resilient portion of said return spring towards a fixed resilient portion of said return spring during shutter opening movement of said shutter driver, in order to enable said return spring to initiate shutter closing movement of said shutter driver.

10. A camera as recited in claim 9 wherein said energizing post on said shutter driver projects through a clearance slot in one of said shutter blades to contact said movable resilient portion of said return spring and is movable within said clearance slot to push said movable resilient portion.

11. A camera comprising a dual-blade shutter having a pair of shutter blades supported for pivoting away from one another to open and for pivoting towards one another to close, and a shutter driver is supported for shutter opening and closing movement and has a drive post that projects into respective overlapping slots in said shutter blades to move within said overlapping slots to pivot said shutter blades open and closed, is characterized in that:

a high energy lever is spring-urged to swing against said shutter driver to cause shutter opening movement of said shutter driver, then swings away from said shutter driver, and is returnable past said shutter driver to be reset; and a fixed round post projects into an elongate slot in said shutter driver to support said shutter driver to rotate in opposite directions for shutter opening and closing movement and to allow said high energy lever to translate said shutter driver out of the way of said high energy lever so that said high energy lever can be returned past said shutter driver without causing said shutter blades to be pivoted open.

12. A camera as recited in claim 11, wherein said shutter blades are substantially j-shaped and reverse j-shaped to surround an exposure aperture to uncover said exposure aperture when said shutter blades are open and cover said exposure aperture in partially overlapping relation when said shutter blades are closed.

13. A camera as recited in claim 11 wherein said fixed post that projects into said elongate slot in said shutter driver also projects into a round pivot hole in one of said shutter blades to support that blade to pivot open and closed.

14. A camera as recited in claim 11 wherein said shutter driver has a strike tab on a curved edge portion of said shutter driver, and said high energy lever has a striker portion on an underside of said high energy lever for striking said strike tab to cause shutter opening movement of said shutter driver.

15. A camera as recited in claim 11 where a fixed round post projects into a round pivot hole in said high energy lever to support said high energy lever to swing against said shutter driver to cause shutter opening movement of said shutter driver, and a high energy spring is coiled about said fixed round post and includes a spring leg for urging said high energy lever to swing against said shutter driver.

16. A camera as recited in claim 11 wherein said fixed post that projects into said elongate slot in said shutter driver also projects into a round pivot hole in a first one of said shutter blades to support said first blade to pivot open and closed, and a stop post that contacts said first blade when said first blade is closed causes said first blade to constrain said shutter driver to translate along said fixed post that projects into said elongate slot in said shutter driver when said high impact striker shifts said shutter driver out of the way of said high impact striker.

17. A shutter operating method comprising:

moving a high impact striker against a strike tab on a rotatable and translatable shutter driver to initiate shutter opening rotation of the shutter driver;

moving the high impact driver beyond the strike tab to allow shutter closing rotation of the shutter driver;

returning the high impact driver past the strike tab to reset the high impact driver, after shutter closing rotation of the shutter driver; and causing the high impact driver to translate the shutter driver out of the way of the high impact driver, when the high impact driver is returned past the strike tab, in order to prevent shutter opening rotation of the shutter driver.

18. A shutter operating method as recited in claim 17, wherein the shutter driver is rotated about and translated along a fixed post that extends through an elongate slot in the shutter driver.

19. A shutter operating method as recited in claim 18 wherein a shutter blade is pivoted open and closed about the fixed post.

* * * * *